March 3, 1970 — F. E. LITTMAN — 3,498,909

DESALINATION APPARATUS AND PROCESS

Filed Dec. 29, 1966 — 2 Sheets-Sheet 1

FRED E. LITTMAN
INVENTOR.

BY Max Gelden

ATTORNEY

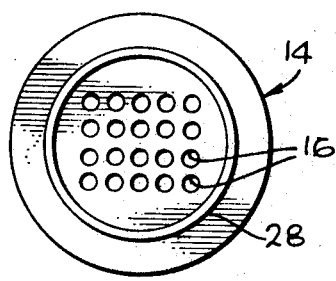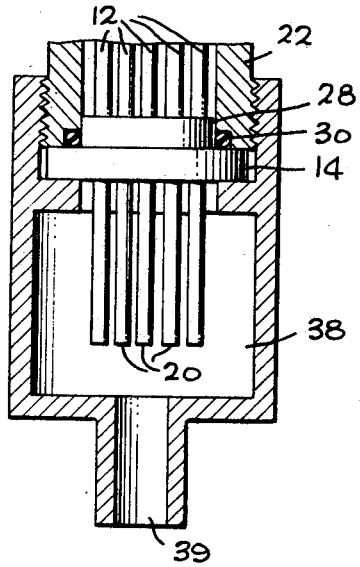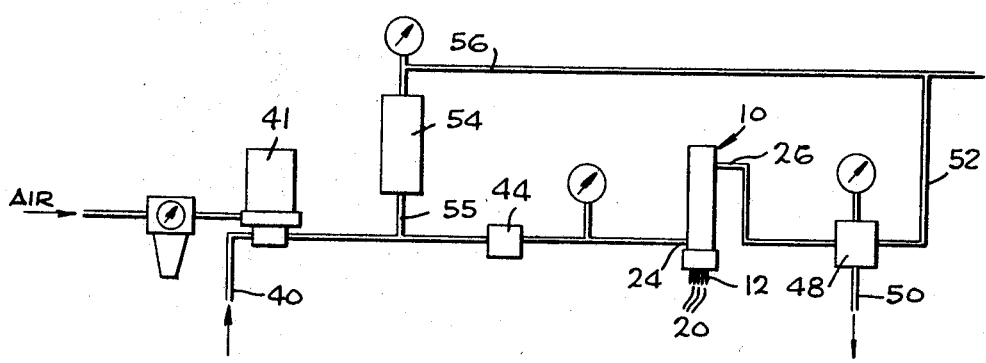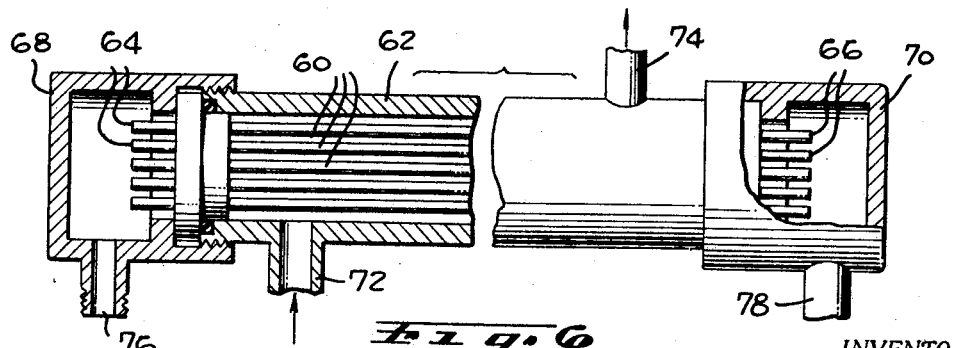

United States Patent Office 3,498,909
Patented Mar. 3, 1970

3,498,909
DESALINATION APPARATUS AND PROCESS
Fred E. Littman, Santa Ana, Calif., assignor, by mesne assignments, to McDonnell Douglas Corporation, Santa Monica, Calif., a corporation of Maryland
Filed Dec. 29, 1966, Ser. No. 605,703
Int. Cl. B01d 31/00, 13/00
U.S. Cl. 210—23
11 Claims

ABSTRACT OF THE DISCLOSURE

Desalination apparatus employing a plurality of porous glass elongate capillary membranes disposed in a fluid tight pressure chamber having an inlet and outlet, said membranes being preferably in the form of porous glass capillary tubes arranged in closely spaced substantially parallel relation. The adjacent ends at one end of the capillary membranes are closed with respect to the interior of the pressure chamber, and the adjacent opposite ends are open and extend out of the pressure chamber, according to one embodiment.

---

This invention relates to water desalination, and is particularly concerned with a reverse osmosis process employing an improved novel membrane for removal of salt and other solutes from water, such as sea or brackish water, and to a reverse osmosis apparatus incorporating such membrane for practicing said process.

It is known to empoly cellulose acetate membranes in the reverse osmosis process for water desalination. However, such membranes are susceptible to physical and chemical changes, fouling, biological attack and aging. These disadvantages result in inferior operation due to decrease in throughput capacity (flux) and loss of salt salt rejection properties, relatively short membrane life, and high maintenance and replacement costs for the membrane. Further, in conventional apparatus employing such prior art membranes, generally a plate and frame arrangement is utilized, employing a plurality of such membranes, each membrane requiring a pressure back-up plate and a large O-ring seal, resulting in a relatively complex arrangement of membranes, together with their associated back-up plates and sealing rings.

It has also been previously proposed to employ flat porous glass discs as membranes in a reverse osmosis system for water desalination. However, when utilizing such a system, inferior salt rejection results have been obtained, e.g., of the order of only about 5 to 10%. Further, such flat porous glass discs are fragile and likewise require the use of pressure back-up plates as in the case of cellulose acetate membranes. Previous investigators have found it necessary when employing such porous glass discs to incorporate feed water additives into the feed solution to enhance the ion exchange properties and salt rejecting ability of the glass, in order to obtain worthwhile salt rejection values.

It has been found according to the invention that highly improved desalination results can be obtained and the above noted disadvantages substantially overcome by employing as the membrane in a reverse osmosis system for desalination of water, a plurality of porous glass elongate capillary membranes, preferably in the form of porous glass capillary tubes. Such capillary membranes or tubes are preferably arranged in closely spaced substantially parallel relation in the form of a tube bundle in the desalination apparatus.

In carrying out the desalination of water employing the porous glass capillary membranes or tubes according to the invention, the feed solution is applied under pressure to the outer surfaces of the capillary tubes, forcing the solution through the porous glass wall of the tubes, thus effecting desalination, and the resulting solution of reduced salt content is withdrawn from the capillary membranes or tubes as product.

Thus there is provided by means of the invention a process for desalinating water which comprises applying pressure to a solution to be desalinated, forcing said pressurized feed solution through the walls of porous glass elongate capillary membranes, and withdrawing a solution of substantially reduced salt content from the interior of said capillary memranes.

There is also provided according to the invention, desalination apparatus which comprises means forming a first enclosed fluid pressure receiving zone, a pressure fluid inlet to said first zone and a pressure fluid outlet from said zone, means mounting a plurality of porous glass elongate capillary membranes in said zone, the ends of said membranes being closed to communication with said first zone, and a second product receiving zone, adjacent ends at one end of each of said capillary membranes being disposed in said second zone, said adjacent ends of said capillary membranes being open and in communication with said second zone.

By employment of the invention concept using porous glass capillary membranes or tubes in a reverse osmosis system for desalination of water, due to the large active membrane surface area achieved per unit volume occupied, increased water fluxes are achieved substantially greater than the values previously reported employing cellulose acetate or porous glass membranes or discs, with high salt rejection efficiency. Thus, for example, one cubic inch of porous glass capillary membranes or tubes can produce on the order of a gallon of product water per day, amounting, for example, to about a 70% reduction in volume of filter membrane apparatus over that presently required for systems employing cellulose acetate membranes with suitable back-up plates. Further, employing the capillary membrane or capillary tube concept of the invention salt rejection values of the order of 90% can be achieved employing from about 0.1% to about 1% sodium chloride in the feed water at applied pressure of about 1,000 p.s.i.

The porous glass capillary membrane material and configuration according to the invention result in efficiency characteristics of long life, low maintenance operation and compact design. The porous glass of the capillary membranes or tubes is resistant to chemical and biological attack, can be fabricated into compact capillary shapes, does not require a plurality of back-up plates and a plurality of O-ring seals as in conventional cellulose acetate and porous glass disc systems, allows back-flushing procedures to be carried out without injuring the surface characteristics of the porous glass capillary membranes or tubes, whereas back-flushing with cellulose acetate membranes is difficult due to the danger of injury to the delicate active surfaces thereof, and the porous glass capillary membranes and tubes of the inventioin can be stored dry, whereas cellulose acetate membranes usually require wet storage and must be kept free from bacterial degradation. Further, with the porous glass membranes and tubes of the invention, desalination operations can be carried out at substantially higher temperature, e.g., of the order of about 40 to about 75° C. and higher, resulting in improved flux and salt rejection performance, whereas desalination procedures with cellulose acetate membranes, for example, must be carried out at lower temperatures to avoid deterioration of the membrane. Further, the porous glass capillary membranes or tubes of the invention, when employed in a reverse osmosis system for desalination of water, do not exhibit initial loss in flux as does cellulose acetate membranes.

The invention will be more clearly understood by reference to the description below taken in connection with the accompanying drawing, wherein:

FIG. 3 is a plan view of the end cap of the divice of FIG. 1, for mounting and supporting the porous glass capillary tubes;

FIG. 4 illustrates a modification of the device of FIG. 1;

FIG. 5 illustrates a desalination system incorporating the device of FIGS. 1 to 4; and FIG. 6 illustrates a modified form of desalination apparatus employing the porous glass membranes or tubes of the invention.

Figure 1:
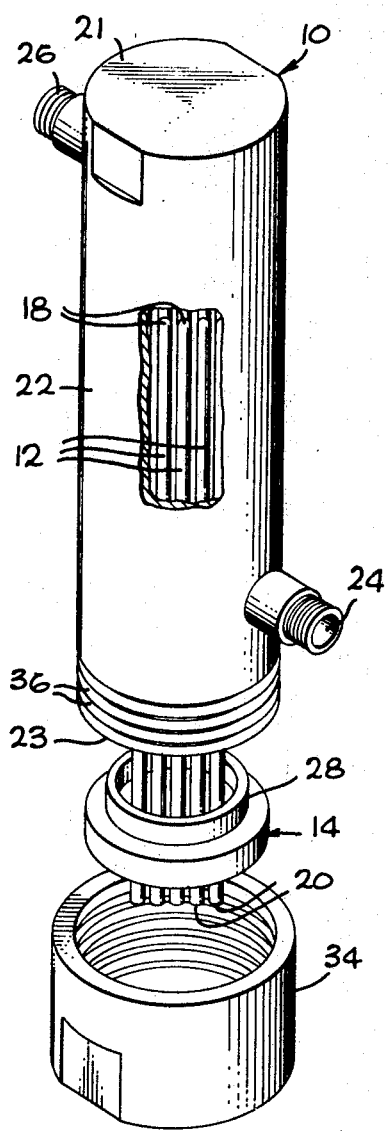
FIG. 1 illustrates an exploded isometric view of a desalination apparatus employing the invention principles, shown partly broken away.
Figure 2:
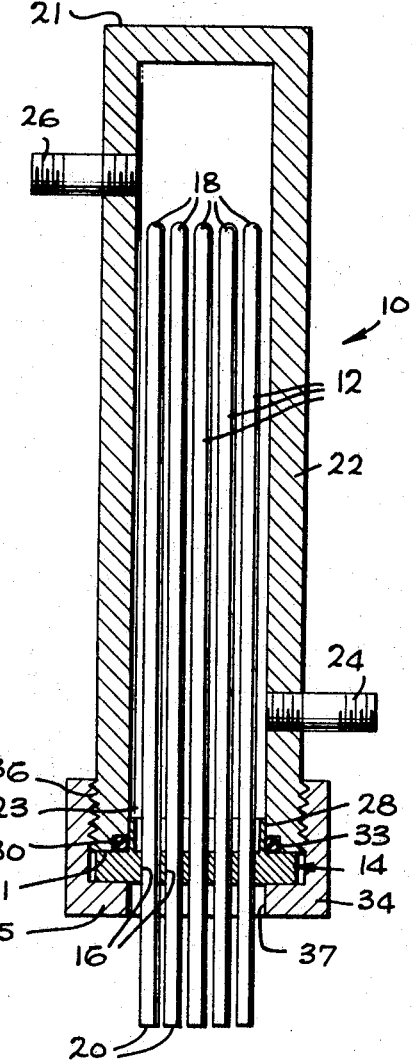
FIG. 2 is a sectional elevation of the desalination apparatus shown in FIG. 1, when assembled.

Referring to FIGS. 1 to 4 of the drawing, numeral 10 illustrates a desalination apparatus or pressure cell according to the invention, which comprises a plurality, here indicated as twenty in number, of closely spaced porous glass capillary tubes 12 arranged in the form of a bundle of tubes in substantially parallel relation, mounted or supported on an end cap 14. Each of the capillary tubes 12 is supported in a hole 16 of the end cap 14, the outer diameter of such holes being about the same as the outer diameter of the capillary tubes, so that the latter are held in position in the end cap, e.g., by means of a suitable cement such as an epoxy resin, with the tubes protruding from opposite sides of the end cap as seen in FIGS. 1 and 2. The tubes are sealed at one end as indicated at 18 and are open at the opposite end at 20. The tubes 12 are mounted on the end cap so that all of the closed ends 18 of the tubes are adjacent each other, and all of the open ends 20 are adjacent each other, with the major length of the tubes adjacent the closed ends 18 being on one side of the end cap 14, and the remaining short portions adjacent the open ends 20 extending from the opposite side of the end cap.

The arrangement of the porous glass capillary tubes on the supporting end cap 14 is positioned within the shell 22 of a pressure cell, having an inlet port 24 for high pressure feed solution and an outlet port 26. The shell 22 has a closed end 21 and an open end 23. The end cap 14 carries a circular flange 28 on one side thereof, and an O-ring seal 30 is positioned around the outer periphery of the flange 28. The porous glass capillary tubes 12 carried on the end cap 14 are positioned in the shell 22 by inserting the longer portions of the tubes 12 on one side of the end cap through the open end 23 of the shell with the closed ends 18 of the tubes disposed in the interior of the shell, and bringing the end cap 14 into frictional engagement with the lower inner surface 31 of the shell 22, the O-ring seal 30 seating in the groove 33 and forming a pressure seal to close the end 23 of the shell by means of the end cap 14. When so assembled, the short open end portions of the capillary tubes 12 protrude from the bottom of the cell. An internally threaded nut 34 is then engaged with an external thread 36 at the bottom of the shell 22, the lower flanged portion 35 of the nut maintaining the end cap 14 in position on the end 23 of the shell, and the short open ends of the tubes 12 extending outwardly through the aperture 37 in the nut.

Any suitable porous glass composition can be employed in producing the porous glass capillary membranes or tubes, illustrated at 12 in FIGS. 1 and 2. Preferably, a porous high purity silica is utilized for this purpose. A preferred porous glass is that which is marketed as Porous Glass No. 7930 by Corning Glass Company. This is understood to be a leached borosilicate glass resulting in a porous high silica sponge-like structure which is left unfired to retain its porosity characteristics. The Porous Glass No. 7930 is an intermediate product in the manufacture of Vycor Glass and contains of the order of about 96% silica ($SiO_2$). Although unfired, the strength of such porous glass is relatively high and is of the order of that for non-porous glass that has been abraded. The strength of such glass is sufficient when formed into capillary tubes, to withstand applied pressures, e.g., of the order of 1500 p.s.i., without collapsing. It will be understood of course that any other suitable glass composition can be employed which has suitable porosity and can be formed into capillary tubes according to the invention.

The porosity of the glass capillary membranes or tubes such as 12 in FIG. 1 can vary over a relatively wise range. Thus, for example, the pore diameters of the porous glass tubes can range from about 30 A. (Angstroms) to about 200 A. or greater, e.g., up to about 400 A., preferably from about 30 A. to about 100 A., and preferably having an average pore diameter of the order of about 40 A.

The diameter of the porous glass capillary membranes or tubes such as 12 of FIG. 1 can also vary. Thus, for example, the outside diameter of the porous glass capillary tubes can range from about 0.020 to about 0.100 inch, with glass capillary tubes having an outside diameter of 0.060 inch being employed in the apparatus illustrated in FIGS. 1 to 4. The wall thickness of the porous glass capillary tubes can also vary, it being preferred to employ thinner wall thicknesses to obtain higher throughput or flux rates. Thus, for example, tube wall thicknesses can range from about 0.005 to about 0.030 inch, the thickness of the porous glass tubes 12 illustrated in the apparatus of FIGS. 1 to 4 being about 0.015 inch thick.

Any suitable length of the porous glass capillary tubes or membranes can be employed. With capillary tubes of greater outside diameters and greater wall thicknesses, usually tubes of greater length having the required rigidity and strength can be used. Thus, for example, the length of the capillary tubes can range from as little as 1 inch up to about 15 inches or greater, the overall length of the tubes 12 employed in the apparatus of FIGS. 1 to 4 being 6 inches, with about 5 inches effective length of the tubes being disposed within the shell 22.

The number of porous glass capillary membranes or tubes which can be employed in a bundle in a single cell, can vary as desired to obtain a desired capacity. Thus, for example, the number of tubes can range from about 10 to about 100 tubes or more per square inch of the mounting plate, e.g., of the end cap 14, on which the tubes are supported. In the example illustrated in FIGS. 1 to 3 as previously noted, twenty tubes are employed. The porous glass capillary tubes can be positioned as close to each other as desired, provided sufficient space is left between tubes to obtain free flow of the feed liquid around and in contact with the entire outer surface of each of the tubes.

It will be understood that all of the ranges given above are intended as exemplary, and not as limitative of the invention.

In the embodiment illustrated in FIGS. 1 to 3, it is noted that product issuing from the lower open ends 20 of the porous capillary tubes 12 can be collected by placing a suitable receiver (not shown) below the ends 20 of the tubes. However, according to a modification illustrated in FIG. 4, if desired, the zone around the lower open ends 20 of the tubes 12 can be enclosed as indicated at 38 to form a product receiver, the product collected in the enlosed receiving zone 38 being discharged at 39.

The desalination cell or apparatus 10 illustrated in FIGS. 1 to 3 can be employed in a desalination system illustrated by the flow scheme shown in FIG. 5. Thus, a saline feed solution can be fed at 40 from a reservoir (not shown) to a pump 41 and air pressure applied at 41 to provide a feed solution under a pressure, for example, of about 1000 p.s.i. The pressurized saline feed solution is then passed through a filter 44 and into the inlet port 24 of the desalination cell 10 of the invention. A substantially desalinated product solution is discharged from the open ends 20 of the porous glass capillary tubes 12 as product.

Saline solution under pressure is discharged from the shell 22 via the outlet port 26 and is returned via line 50 to the reservoir. A back pressure regulator 48 is provided in the system, and is connected via line 52 to a hydraulic accumulator 54 to which high pressure air is fed at 56, the high pressure accumulator being connected into the pressurized saline feed solution line at 55.

The feed solution pressures applied in the system illustrated in FIG. 5, employing the desalination cell illustrated in FIGS. 1 to 3, can range, for example, from about 500 to about 1500 p.s.i., usually from about 1000 to about 1500 p.s.i. The higher the pressure applied, the greater the throughout rate or flux.

The concentration of salt such as sodium chloride in the feed solution to be desalinated, can range, for example, from about a 0.1% to about a 5% NaCl solution. The lower the concentration of solute or salt in the feed, generally the greater the degree of salt rejection obtained employing the porous glass capillary membranes of the invention. However, even with relatively concentrated salt solutions good salt rejection values with high flux rates can be obtained. Thus, for example, with feed solutions containing from 0.1 to about 1% sodium chloride, salt rejection results of the order of about 90% are obtainable, with applied feed pressures of the order of about 1000 to about 1500 p.s.i.

Using an apparatus of the type illustrated in FIGS. 1 to 3, employing 20 porous glass capillary tubes 12 of 5 inches effective length each, with an outside diameter of 0.060 inch and a wall thickness of 0.015 inch, and incorporating such apparatus in a system similar to that illustrated in FIG 5, and employing a sodium chloride feed solution having a concentration of 0.12% NaCl at an applied presure of 1500 p.s.i., a flux corresponding to as high as about two gallons per square foot of outer capillary surface per day is obtained, with salt rejection as high as about 87%. This indicates that employing the apparatus of the invention high fluxes can be achieved while maintaining high salt rejection.

Since no mechanical support is required for the porous glass membranes 12 other than the base support member 14, breakage of the porous glass membranes or tubes is minimized. Further, the use of the simple support member 14 with a single O-ring pressure seal 30 permits ease in replacing capillary tubes when desired.

In another test employing an apparatus of the type illustrated in FIGS. 1 to 3 and described immediately above, in a system as illustrated in FIG. 5, the maximum flux obtained was 1730 gallons of effluent per day per cubic foot of bundled capillaries, with a feed solution containing 0.1% sodium chloride at a pressure of 1000 p.s.i., a salt rejection value of 75% being obtained.

On the other hand, employing a conventional desalination cell with 32 cellulose acetate membranes each in combination with a 3/8 inch back-up plate, a 0.1% sodium chloride feed at 1000 p.s.i. in a system of the type illustrated in FIG. 5, only 632 gallons of effluent was produced per day per cubic foot of this plate and frame apparatus. On this basis, the volume of filter equipment employing the porous glass capillary tube bundles of the invention to produce 1000 gallons per day of desalinated effluent is about 1000 cubic inches, whereas the volume of plate and frame filter apparatus employing cellulose acetate membranes for producing 1000 gallons per day of effluent is 2700 cubic inches. Thus, with the maximum fluxes obtainable with porous glass capillary tubes as desalination membranes according to the invention, a desalination apparatus can be provided having less than half the volume of a cellulose acetate desalination system.

Referring now to FIG. 6, there is illustrated a modification wherein porous glass capillary tubes 60 according to the invention are mounted in a shell or housing 62, with the opposite ends of the tubes 60 being open, as indicated at 64 and 66, the opposite open ends of the tubes discharging into external headers 68 and 70 connected to the opposite ends of the pressure shell 62. In this modification, water to be desalinated is introduced into inlet port 72 under pressure, to circulate around the porous glass capillary tubes 60 within shell 62, and is discharged via the outlet port 74. Desalinated product effluent discharged from the open ends 64 and 66 of the capillary tube 60 is removed as product at 76 and 78.

From the foregoing, it is seen that the invention provides a novel improved and efficient desalination apparatus and process, for removal of salts and solutes from a feed solution, by the reverse osmosis principle.

I claim:

1. Desalination apparatus which comprises means forming a first enclosed fluid pressure receiving zone, a pressure fluid inlet to said first zone and a pressure fluid outlet from said zone, means mounting a plurality of uncoated porous glass elongate capillary tubes in said zone, the ends of said tubes being closed to communication with said first zone, a second product receiving zone, adjacent ends at one end of each of said capillary tubes being disposed in said second zone, said adjacent ends of said capillary tubes being open and in communication with said second zone, said tubes having an outside diameter in the range from about 0.020 to about 0.100 inch, and a wall thickness in the range from about 0.005 to about 0.030 inch, and being so constructed and aranged that a salt rejection rate in the order of about 90% is obtainable with feed solutions containing from about 0.1 to about 1% sodium chloride and a feed pressure of about 1,000 to about 1,500 p.s.i.

2. Desalination apparatus as defined in claim 1, said porous glass capillary tubes having a porosity in the range from about 30 to about 200 A.

3. Desalination apparatus as defined in claim 1, said porous glass being a porous high silica glass.

4. Desalination apparatus as defined in claim 1, said tubes being arranged in the form of a bundle, with adjacent ends at the opposite end of each of said tubes being disposed in said first zone, said last mentioned adjacent ends of said tubes being sealed.

5. Desalination apparatus as defined in claim 1, including a third product receiving zone, said tubes being arranged in the form of a bundle, with adjacent ends at the opposite end of each of said tubes being disposed in said third zone, said last mentioned adjacent ends of said tubes being open and in communication with said third zone.

6. Desalination apparatus as defined in claim 1, including means for applying fluid pressure to said first zone.

7. Desalination apparatus as defined in claim 1, said first mentioned means comprising a shell closed at one end, a pressure fluid inlet to said shell and a pressure fluid outlet from said shell, said means mounting said porous glass tubes comprising an end member and a cooperating seal enclosing the opposite end of said shell, said tubes protruding out of said end member, the ends of said tubes in said shell being sealed and the outer ends of said tubes protruding from said end member and disposed in said product receiving zone being open.

8. A process for desalinating water which comprises applying pressure to a solution to be desalinated, forcing said pressurized feed solution through walls of uncoated porous glass elongate capillary tubes, and withdrawing a solution of substantially reduced salt content from the interior of said capillary tubes, said tubes having an outside diameter in the range from about 0.020 to about 0.100 inch, and a wall thickness in the range from about 0.005 to about 0.030 inch whereby rejection rates in the order of 90% are obtainable with feed solution concentrations of about .1 to 1% sodium chloride and a feed pressure of about 1,000 to about 1,500 p.s.i.

9. A process as defined in claim 8, wherein said tubes are arranged in closely spaced relation, said pressurized feed solution contacting the outer surfaces of said tubes, said solution of reduced salt content being withdrawn from an open end of said tubes.

10. A process as defined in claim 9, the pressure of said feed solution ranging from about 500 to about 1500 p.s.i., said porous glass capillary tubes having a porosity in the range from about 30 to about 400 A.

11. A process as defined in claim 9, said porous glass being a porous high silica glass.

References Cited

UNITED STATES PATENTS

| | | | |
|---|---|---|---|
| 3,193,582 | 7/1965 | Adams et al. | 210—23 X |
| 3,198,335 | 8/1965 | Lewis et al. | 210—321 |
| 3,228,876 | 1/1966 | Mahon | 210—22 |
| 3,269,817 | 8/1966 | Bondley | 55—16 X |
| 3,279,902 | 10/1966 | Gardner | 55—16 X |
| 760,364 | 5/1904 | Woolworth | 210—491 |
| 3,019,853 | 2/1962 | Kohman et al. | 55—158 X |
| 3,186,941 | 6/1965 | Skiens | 210—500 X |
| 3,246,764 | 4/1966 | McCormack | 210—321 |
| 3,368,329 | 2/1968 | Eguchi et al. | 55—158 |
| 3,422,008 | 1/1969 | McLain | 210—321 X |

FOREIGN PATENTS 212,233    4/1924    Great Britain.

OTHER REFERENCES

Melnyk et al.: "Extraction of Helium From Natural Gas, The Diffusion-Through-Glass Process," from The Canadian Mining and Metallurgical Bulletin, October 1961, vol. 54, pp. 768–774.

Rickles: "Molecular Transport in Membranes," from Industrial and Engineering Chemistry, vol. 58, No. 6, received in Patent Office June 2, 1966, pp. 18–20 relied on.

Kraus et al. "Salt Rejection by a Porous Glass," from Science, vol. 151, Jan. 14, 1966, pp. 194 and 195 relied on.

REUBEN FRIEDMAN, Primary Examiner

F. A. SPEAR, JR., Assistant Examiner

U.S. Cl. X.R.

210—321, 500